(No Model.)

M. WRIGHTSMAN.
TREE AND POST SUPPORTER.

No. 350,281. Patented Oct. 5, 1886.

WITNESSES:
Donn Twitchell
C. Sedgwick

INVENTOR:
M. Wrightsman
BY Munn & Co.
ATTORNEYS.

UNITED STATES PATENT OFFICE.

MIMA WRIGHTSMAN, OF HARPER, KANSAS.

TREE AND POST SUPPORTER.

SPECIFICATION forming part of Letters Patent No. 350,281, dated October 5, 1886.

Application filed January 15, 1886. Serial No. 188,653. (No model.)

*To all whom it may concern:*

Be it known that I, MIMA WRIGHTSMAN, of Harper, in the county of Harper and State of Kansas, have invented a new and Improved Tree and Post Supporter, of which the following is a full, clear, and exact description.

My invention relates to devices adapted to support trees when being transplanted, and posts while they are being set into the ground, and has for its object to provide a simple, inexpensive, and efficient support, by using which the work of setting the trees or posts may be accomplished with economy of time and labor.

The invention consists in a tree and post supporter comprising a pair of arms pivoted to each other and adapted to grasp the tree or post to be set, and provided with teeth or pins which may be driven into the ground to hold the tree or post in place while the earth is packed around it.

The invention comprises also an arrangement of a brace held to a bar adapted for adjustment to the pair of pivoted bars, and adapted to support a tree or post not grasped by the pivoted bars, all as hereinafter fully set forth.

Reference is to be had to the accompanying drawings, forming a part of this specification, in which similar letters of reference indicate corresponding parts in both the figures.

Figure 1:
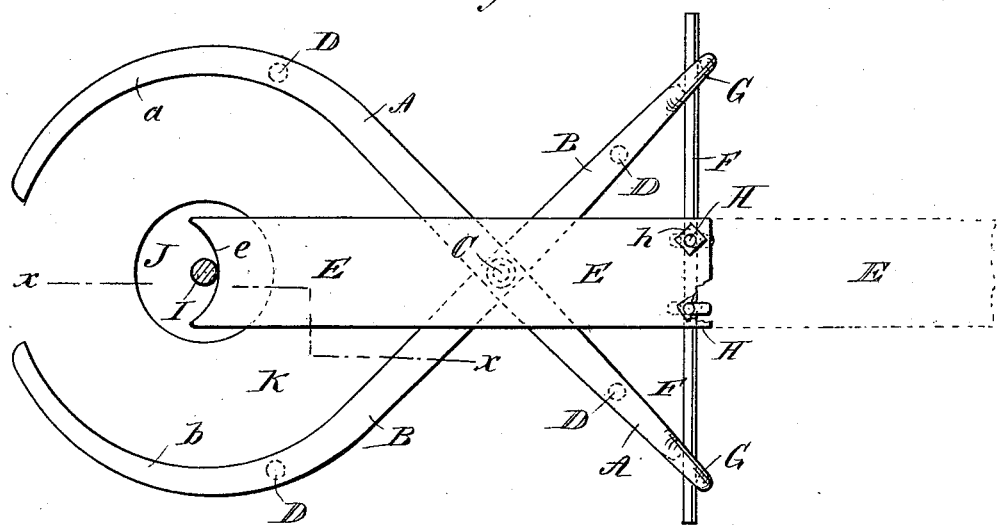
Figure 2:
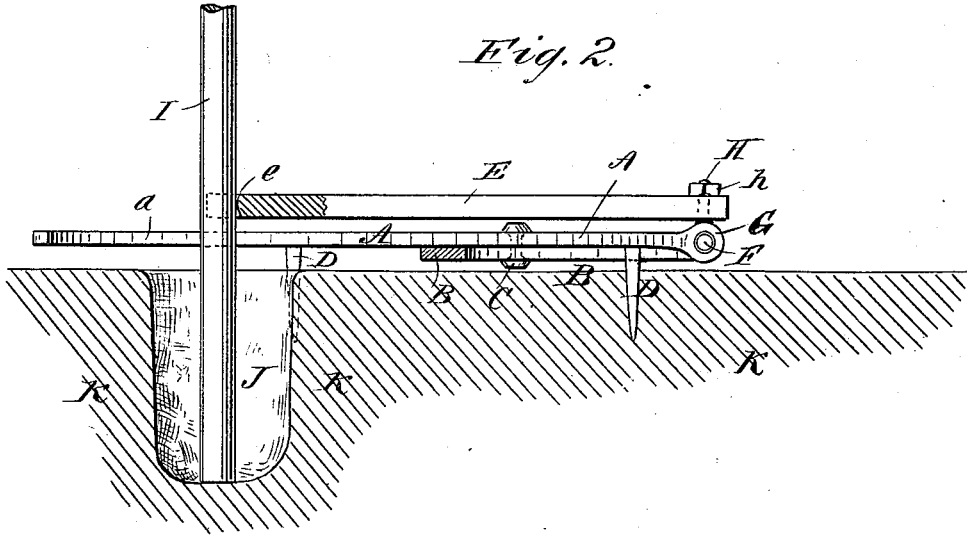

Figure 1 is a plan view of the tree and post supporter as applied to use to support a fence-post while it is being set in the ground; and Fig. 2 is a vertical sectional elevation with the supporter in section on the irregular line $x$ $x$, Fig. 1.

In its simplest form the tree and post supporter consists of two metal bars, A B, pivoted together strongly at C, and preferably having inbent or curved forward ends, as at $a$ $b$, which form jaws to grasp the tree or post to be set into the ground. The bars A B are provided with pins D at their lower faces, and these pins are to be forced into the ground after the jaws $a$ $b$ are closed upon the tree or post to be supported in the hole dug for it, thus leaving both hands of the operator free to pack the earth into the hole around the tree or post.

In setting or transplanting light or small trees or posts into the ground, the support, consisting of pivoted bars A B, provided with pins D, and operated as above described, will serve well; but in setting large trees or posts into the ground, or when the hole in the ground is too large to place the device close enough to support the tree or post by direct hold of it by the jaws $a$ $b$ and the driven pins D, as above described, I will employ the brace E, which consists, preferably, of a piece of plank notched at its forward end, as at $e$, and connected to a metal bar, F, which is held in eyes G G, formed at the back ends of the pivoted bars A A of the supporter, as shown in the drawings. I prefer to connect the brace E to the bar F by means of eyebolts H, slipped onto the bar and passed through the end of the brace and receiving nuts $h$ $h$ on their ends, and by which construction the brace E may not only be adjusted laterally or lengthwise of the bar F by slipping the eyebolts H thereon, but the brace E may also be swung backward on the bar as a pivot, and as indicated by dotted lines. In using the supporter last above described it will be made fast to the ground by the pins D, when the jaws $a$ $b$ are opened considerably and the brace E will be swung forward after the tree or fence-post, I, to be set is placed in the hole, J, dug for it in the ground K, and whereby the tree or post will be held up, while the operator has both hands free to pack the earth in the hole around the post, and whereby time and labor will be economized, as one person may in this manner set or transplant trees or set fence or other posts with comparative ease and safety. The bar F may be quickly slipped from the eyes G of the bars A B when the brace E is not to be used, and the bar and brace may as readily be adjusted to the bars A B when required.

Having thus fully described my invention, I claim as new and desire to secure by Letters Patent—

1. A tree and post supporter comprising a pair of arms, A B, pivoted together at C, and provided with pins D, substantially as and for the purposes set forth.

2. In a tree and post supporter, the combination, with a pair of arms, A B, pivoted together at C, and provided with pins D, of a bar, F, held by the arms, and a brace, E, held by the bar and adapted to support the tree or post when the arms A B are opened and made fast to the ground, substantially as herein set forth.

3. In a tree and post supporter, the combination, with a pair of arms, A B, pivoted together at C, and provided with pins D and with eyes G G, of a bar, F, held in the eyes, and a brace, E, held pivotally to the bar by eyebolts H, substantially as shown and described, and for the purposes set forth.

MIMA WRIGHTSMAN.

Witnesses:
I. P. CAMPBELL,
W. M. GLENN.